G. F. HOFFMAN.
BED HAMMOCK.
APPLICATION FILED JULY 14, 1908.
917,866. Patented Apr. 13, 1909.
3 SHEETS—SHEET 1.
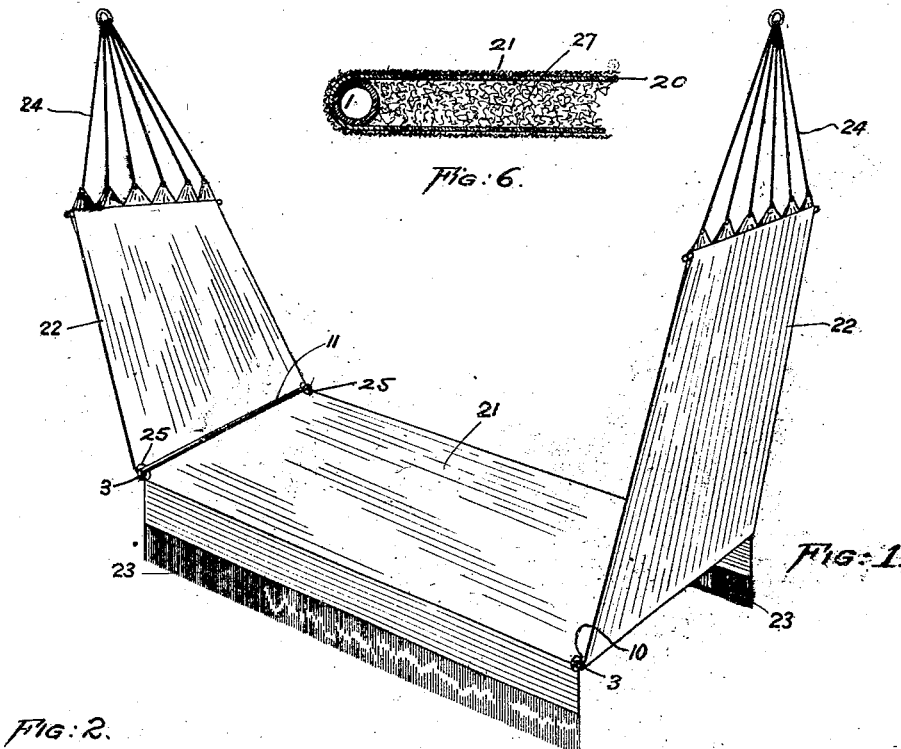
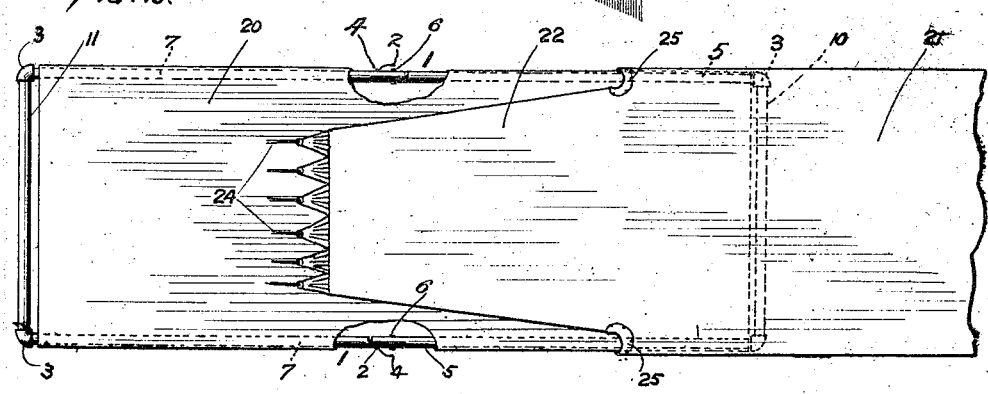
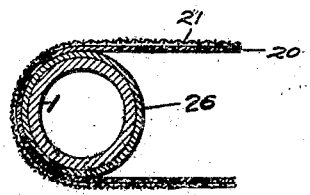
WITNESSES:
M. G. Egan
M. E. Eastlack
INVENTOR.
George F. Hoffman.
BY
William S. Jackson
ATTORNEY G. F. HOFFMAN.
BED HAMMOCK.
APPLICATION FILED JULY 14, 1908.
917,866.
Patented Apr. 13, 1909.
3 SHEETS—SHEET 2.
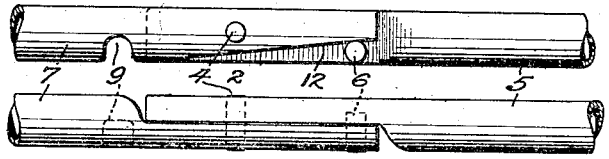
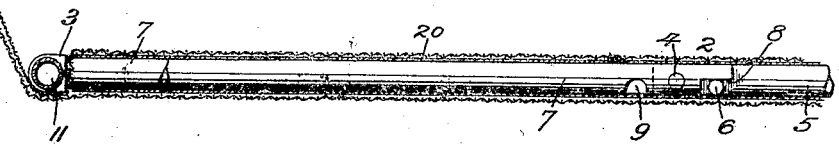
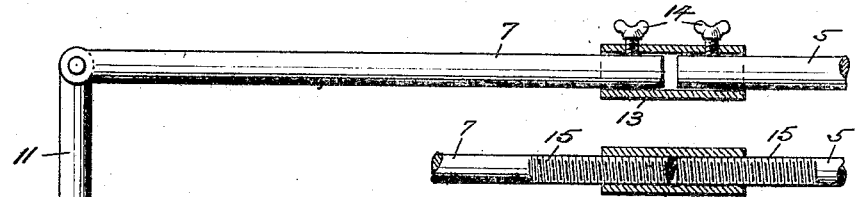
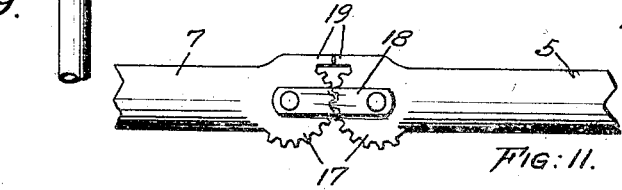
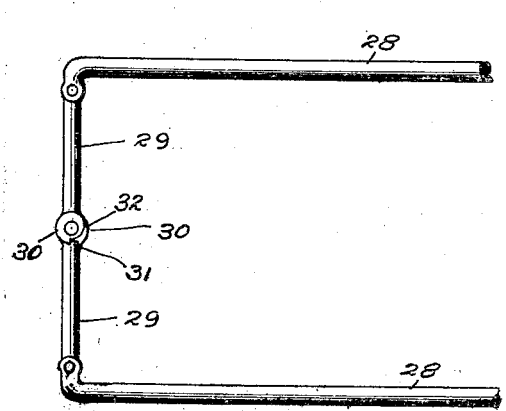
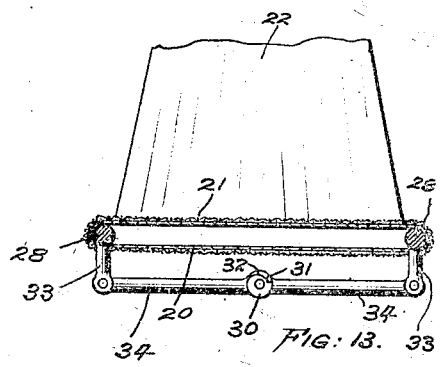
WITNESSES:
M. G. Egan
M. E. Elastack
INVENTOR.
George F. Hoffman.
BY
William J. Jackson.
ATTORNEY.

G. F. HOFFMAN.
BED HAMMOCK.
APPLICATION FILED JULY 14, 1908.
917,866.
Patented Apr. 13, 1909.
3 SHEETS—SHEET 3.
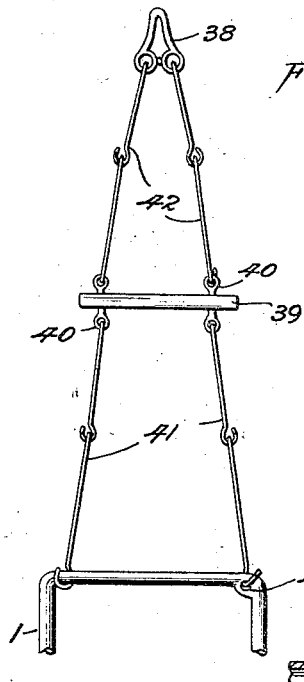
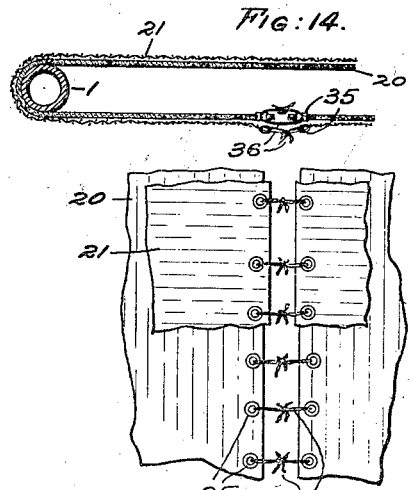
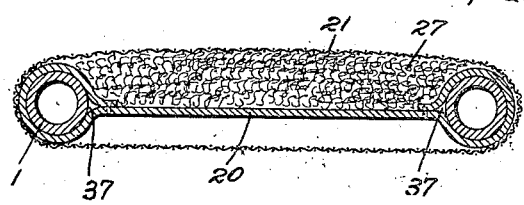
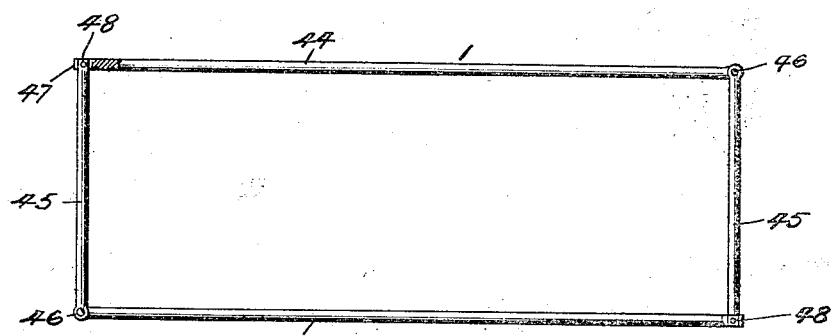
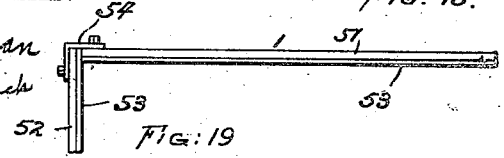
WITNESSES:
M. G. Egan
M. E. Eastlack
INVENTOR.
George F. Hoffman
BY
William S. Jackson
ATTORNEY.

UNITED STATES PATENT OFFICE.

GEORGE F. HOFFMAN, OF PHILADELPHIA, PENNSYLVANIA.

BED-HAMMOCK.

No. 917,866.	Specification of Letters Patent.	Patented April 13, 1909.

Application filed July 14, 1908. Serial No. 443,419.

*To all whom it may concern:*

Be it known that I, GEORGE F. HOFFMAN, a citizen of the United States, residing at Philadelphia, in the county of Philadelphia and State of Pennsylvania, have invented certain new and useful Improvements in Bed-Hammocks, of which the following is a specification.

The principal object of the present invention is to provide a bed-hammock that is neat in appearance, simple and inexpensive in construction and comparatively light in weight.

A further object of the invention is to provide such a hammock provided with a supporting frame capable of being folded whereby the hammock as a whole may be knocked down and folded into compact form.

A further object of the invention is to provide a hammock frame over which are passed tubular coverings of canvas or other material comprising a supporting or stiffening member and a hammock-bed of any desired weave including its complemental valance.

A still further object of the invention is to provide a hammock frame provided with means for drawing taut the canvas or other supporting medium and the hammock-bed.

A still further object of the invention is to provide a hammock having a canvas or other stiffening medium and a hammock-bed the said parts having interposed therebetween a padding or stuffing of any suitable material.

Other objects of the invention relate to general details of construction and will be pointed out hereinafter.

The invention consists of the improvements hereinafter described and finally claimed.

The nature, characteristic features and scope of the invention will be more fully understood from the following description taken in connection with the accompanying drawings forming part hereof and in which:

Figure 1, is a perspective view of a bed-hammock embodying the invention. Fig. 2, is a plan view certain, of the parts being broken away and illustrating the manner of applying the canvas or other supporting member and hammock-bed. Fig. 3, is a view drawn to an enlarged scale and illustrating in cross section the hammock-bed. Fig. 4, is a view in side elevation partly sectioned illustrating certain details of construction. Fig. 5, is a fragmentary view in section illustrating a covering for the hammock frame. Fig. 6, is a similar view illustrating the bed parts padded or stuffed with suitable material. Figs. 7, and 8, are respectively a side elevation and plan view of a modified form of frame attachment shown in Figs. 1, 2, and 4. Fig. 9, is a fragmentary view in plan illustrating a further modified form. Fig. 10, is a similar view illustrating a still further modified form. Fig. 11, is a fragmentary view in side elevation illustrating a still further modified form. Fig. 12, is a view in plan of the hammock frame provided with means serving to stretch or draw taut the hammock-bed. Fig. 13, is a view in cross section illustrating the same. Fig. 14 and 15, are respectively a fragmentary view in cross section and a plan view of the under side thereof of the hammock parts equipped with lacings for drawing taut the hammock parts. Fig. 16, is a view in cross section illustrating the canvas or supporting medium equipped with pockets adapted for the insertion therethrough of the hammock frame. Fig. 17, is a view in elevation showing a hammock support, and Figs. 18, 19 and 20 are detail views.

In the drawings there is shown a generally rectangular frame 1, which may be of metallic or other suitable material and which may be hollow as shown in the drawings, or which may be solid. This frame may be of one continuous piece, but I prefer to construct it in two parts, pivoted together as at 2, in order that the same may be knocked down and folded into compact form. As shown in the drawings use is made of hollow tubular members as piping joined together at the respective corners by means of unions 3. As shown in Figs. 2 and 4, this two-part frame is pivoted together as at 2, by means of rivets or other suitable devices 4, and the members 5, of said frame provided with pins or projections 6, and the members 7, cut away as at 8, and 9. By this construction the one part of the hammock frame comprising members 5, and their complemental cross piece 10, may be turned in a downward direction and folded on to the members 7, and their complemental cross piece 11, the cut away portions 9, accommodating the pins or projections 6, when so folded. It will of course be understood that when the frame is in the position illustrated in Fig. 4, the cut away portion 8, of the members 7, rest upon the pins or projections 6, and serve to keep rigid the hammock frame.

In Fig. 7, and 8, the construction is the same as above described with the exception that the members 7, are beveled as at 12.

In Fig. 9, the pivotally arranged construction is dispensed with and the members 5, and 7, of the hammock frame are provided with a slidable tubular coupling 13, provided with thumb screws 14; whereby the said coupling may be securely fastened with respect to the frame to hold the parts together and whereby the said parts may be readily detached and folded into compact form by merely loosening the thumb screws 14, and sliding over to the left or the right the coupling 13.

In Fig. 10, the members 5, and 7, are screw-threaded as at 15, and an internally threaded coupling 16, is adapted for uniting the frame pieces together.

In Fig. 11, the members 5, and 7, are provided with tooth gear-like sections 17, the said parts being connected together by means of pivotally arranged strips 18. By this construction the parts 5, and 7, may be caused to be folded with respect to each other and in this connection it may be remarked that the parts may be folded only in one direction for the reason that the members 5, and 7, are provided with projections 19, that abut and serve to prevent upward movement. Adapted for application to the above described frame or frames is a canvas or other stiffening or supporting medium 20. As shown in Fig. 3, this stiffening or supporting member 20, is of tubular form and comprises a slip which is passed over the hammock frame as clearly illustrated in Fig. 2. Adapted for passage thereover is the hammock-bed 21, including its complemental wing pieces 22, and valances 23. This hammock-bed or body may be of any of the well known textures and may be designed and woven in any desired colors and effects. This hammock body is also of tubular manufacture as shown in Fig. 3, and is pulled directly over the hammock frame and its canvas fitting as shown in Fig. 2. The wings 22, however, are passed beneath or under the cross bars 10, and 11, of the hammock frame as clearly illustrated in Figs. 1, and 4, and may be suspended in any suitable manner as for instance, by means of cords 24. By passing the wings 22, beneath these pieces 10, and 11, the hammock-bed is drawn taut and serves to relieve the pivotal parts 2, when present from overdue strain.

Adjacent to the portions of the hammock body that engage the respective corners of the hammock frame are reinforcing members 25, which may be metallic eyelets or other suitable devices. It will of course be apparent that these reinforcing devices are necessary to prevent wearing away of the hammock body by reason of friction between the parts. In this connection it may be remarked that if desired coverings of suitable material as 26, may incase the metallic or other members constituting the hammock frame. If desired wadding, stuffing or other suitable material 27, may be inserted in the space between the respective inner faces of the canvas or other stiffening or supporting medium, and the hammock-bed.

Referring now to Figs. 12, and 13, provision is made upon the hammock frame for after they have been passed over the frame. In Fig. 12, the side pieces 28, are provided with a pair of end pieces 29, having pivotal relation with each other and with respect to the parts 28. Arranged centrally of the end pieces 29, are disk-like members 30, of which one is provided with a stop 31, and the other with a cut away portion 32. By this construction the end pieces 29, may be pushed outward to decrease the width of the hammock frame and by a reverse movement of the pieces 29, the width of the hammock frame may be increased and held rigid by reason of the fact that the cut away portion 32, abuts against the projection 31.

In Fig. 13, the construction is the same as above described with the exception that the side pieces 28, are provided with depending members 33, having pivotal relation with which are cross pieces 34, equipped with the disk-like device just described. If desired, the canvas and body part of the hammock may be equipped with lacings, buckles, hooks and eyes or other suitable fastening mediums for drawing the parts together.

In Figs. 14, and 15, the hammock parts are shown as being provided with eyelets 35, and lacings 36. If desired the canvas portion of the hammock body may be provided with pockets 37, as clearly illustrated in Fig. 16. In this event the side members of the hammock frame would be passed through said pockets prior to attaching the end pieces. The tube-like hammock body may then be slipped over the frame as before described in a somewhat loose manner so that when suitable stuffing or wadding is inserted between the canvas and the top of said body, the said top will assume a somewhat convex condition as clearly illustrated.

Referring now to Fig. 17, there is illustrated means for supporting or suspending a bed-hammock. As shown there is interposed between the frame 1, and the ring 38, a bar 39, provided with eyelets 40. Connected with these eyelets 40, and the frame 1, are links 41, and between the eyelets 40, and the ring 38, are other links 42. Such a construction does away with cords ordinarily employed and serves to provide a more or less flexible or yielding support. In this connection it may be remarked that the frame 1, may be provided with apertures 43, at the respective corners thereof either for the insertion of the links 41, or other suitable suspension devices as ropes, cords, or chains.

With respect to the tube-like hammock body 21, it may be preferable to so construct the same that two kinds of material are employed. For instance, the top of the hammock body may be of a good grade of material while the under side may be of a cheaper quality. In manufacturing the tube-like slips or covers this can be readily accomplished and thus decrease the cost of constructing the hammock without effecting the appearance of the same.

In Fig. 18, the frame 1, is shown as comprising side pieces 44, having pivotal relation with which as at 46, are end pieces 45. These end pieces may be connected to the side pieces 44, shown as being slotted at 47, by means of pins 48.

In Fig. 19, there is shown a frame 1, comprising wooden strips 51 and 52, forming the side and end pieces. These wooden strips may be reinforced by means of metal strips 53, and these parts may be held together by means of angle brackets 54, or in some other convenient manner.

In Fig. 20, one of the side pieces 5, may be provided with a pin 49, adapted for insertion within the other side pieces 7, of the frame 1, and may be locked with respect thereto by means of a thumb nut 50.

What I claim is:

1. A hammock comprising a rectangular frame consisting of side and end pieces, a canvas cover arranged above the frame around the side pieces and beneath the frame, a hammock cloth forming a casing arranged above the frame and canvas and under the said end pieces, and suspension means for supporting the frame and cloth ends.

2. A hammock comprising a generally rectangular frame consisting of side and end pieces, a canvas cover arranged above the frame, around the side pieces and having at its edges beneath the frame eyelets, a lacing connecting the eyelets, a hammock cloth forming a casing arranged above the frame and canvas and under the said end pieces, a suspension ring and a spreader, and rigid links yieldingly interposed between said ring, spreader and frame.

3. A hammock comprising a generally rectangular frame, a canvas cover above and below the frame, a hammock cloth above said frame and textile material the said cloth being provided with wings, projected beneath the end pieces of the frame, reinforcing material arranged adjacent to the meeting corners of said cloth and wings and means for supporting the wings.

4. A hammock comprising a generally rectangular frame, a canvas cover arranged above and beneath the frame, a stuffing interposed between the respective inner faces of said cover, a hammock cloth above said frame and cover said cloth being provided with upwardly extending wings and means for supporting the wings.

5. A hammock comprising a frame consisting of side and end pieces, a bed portion of textile material carried by the side pieces, a hammock cloth arranged above the frame and bed portion and beneath the end pieces, a stuffing interposed between the bed portion and cloth and suspension means for the hammock.

6. A hammock comprising a two-part generally rectangular frame consisting of side and end pieces said parts having movable relation with respect to each other, means for holding said frame in extended position, a canvas arranged above and below said frame, a hammock cloth arranged above said covered frame, and beneath the end pieces and suspension means for the hammock.

7. A hammock comprising a generally rectangular framework, a two-part tube-like hammock cloth enveloping said frame, the opposite pieces of said cloth being composed of material of different qualities and suspension means for the hammock.

8. A hammock comprising a generally rectangular frame, a tube-like textile body portion enveloping said frame a hammock cloth arranged above said covered frame and a suspension device arranged at each end of said frame, said suspension device consisting of links 41, a spreader 39, links 42, and a suspension ring 38.

In testimony whereof I have hereunto signed my name in the presence of two witnesses.

GEORGE F. HOFFMAN

Witnesses:
WILLIAM J. JACKSON.
M. E. EASTLACK.